United States Patent
Murray et al.

(10) Patent No.: US 7,424,053 B2
(45) Date of Patent: Sep. 9, 2008

(54) CHANNEL EQUALIZATION IN DATA RECEIVERS

(75) Inventors: Carl Damien Murray, Dublin (IE); Philip Curran, Dublin (IE); Alberto Molina Navarro, Madrid (ES)

(73) Assignee: Agere Systems Inc., Allentown, PA (US)

( * ) Notice: Subject to any disclaimer, the term of this patent is extended or adjusted under 35 U.S.C. 154(b) by 867 days.

(21) Appl. No.: 10/207,882

(22) Filed: Jul. 31, 2002

(65) Prior Publication Data

US 2003/0026333 A1    Feb. 6, 2003

Related U.S. Application Data

(60) Provisional application No. 60/309,165, filed on Aug. 2, 2001.

(51) Int. Cl.
*H03H 7/30* (2006.01)
(52) U.S. Cl. ................ 375/229; 375/350; 375/233; 375/232; 375/230; 333/18; 333/17.1; 327/552
(58) Field of Classification Search ......... 375/229–235, 375/346, 350; 708/323; 333/28 R, 18, 17.1; 327/552
See application file for complete search history.

(56) References Cited

U.S. PATENT DOCUMENTS

| | | | |
|---|---|---|---|
| 5,388,063 A * | 2/1995 | Takatori et al. ............ 708/320 |
| 5,481,564 A * | 1/1996 | Kakuishi et al. ........... 375/230 |
| 5,561,687 A | 10/1996 | Turner ....................... 375/233 |
| 5,617,450 A * | 4/1997 | Kakuishi et al. ........... 375/230 |
| 5,818,378 A | 10/1998 | Cheng et al. ................ 341/155 |
| 6,438,164 B2 * | 8/2002 | Tan et al. .................... 375/233 |
| 6,501,329 B1 * | 12/2002 | Petrofsky et al. ........... 327/552 |
| 6,980,592 B1 * | 12/2005 | Rambaud et al. ........... 375/232 |

FOREIGN PATENT DOCUMENTS

| | | |
|---|---|---|
| EP | 0428129 A2 | 5/1991 |
| EP | 0467412 A2 | 1/1992 |
| EP | 1107527 A2 | 6/2001 |

OTHER PUBLICATIONS

Samueli et al, IEEE Jour on Select Areas in Comm, vol. 9, No. 6, Aug. 1990, pp. 839-847, A 64-Tap CMOS Echo Canceller/Decision . . . .
Chen, Proc 1990 IEEE Int Symp Circ Syst, May 1990, pp. 1947-1950, An All Pole IIR Echo Canceller.

* cited by examiner

*Primary Examiner*—Chieh M. Fan
*Assistant Examiner*—Eva Zheng
(74) *Attorney, Agent, or Firm*—Jacobson Holman PLLC

(57) ABSTRACT

Channel equalization in a 1000BASE-T receiver is performed by a fixed mode analog filter 2 suitable for the longest possible cable length, by a FFE (3), and by a digital filter 4. The digital filter (4) has two sets of taps. One set is optimal for shorter cable lengths and so cancels adaptation for long cable lengths and assists operation of the analog filter. A decision block (5) selects an appropriate set of taps.

7 Claims, 1 Drawing Sheet

CHANNEL EQUALIZATION IN DATA RECEIVERS

This is a complete application claiming benefit of provisional 60/309,165 filed Aug. 2, 2001.

INTRODUCTION

1. Field of the Invention

The invention relates to data receivers such as those for 1000BASE-T ("Gigabit") communication.

2. Prior Art Discussion

Such communication involves compensation for various sources of error. For example, the response of the cable introduces time dispersion, resulting in intersymbol interference (ISI).

The primary existing approaches to equalizing the 1000BASE-T channel are as follows.

1. Analog adaptive equalization. Typically analog equalizers consist of the sum of a weighted version of the input signal. In the case of Ethernet (100BASE-T or 1000BASE-T), the fixed filter is designed to equalize the target cable length (say 100 meters). By choosing appropriate weights cable lengths from 0 meters to the target cable length can be approximately equalized. However such a filter is very complex and a large silicon area and power consumption are required.

2. Digital adaptive equalization. Equalization is achieved by means of a feed-forward equalizer (FFE) which consists of a finite impulse response (FIR) filter, whose input is the signal at the output of the communication channel (the cable plus other analog and digital components in the signal path). The FFE coefficients are adapted so that the convolution of the impulse response of the channel with the impulse response of the FFE approximates a target response. This target response may either be fixed or it may be adaptively constructed by means of a decision feedback equalizer (DFE). The DFE is an adaptive filter whose input consists of the decisions at the output of a decision device (slicer) and whose output is subtracted from the FFE output before going to the slicer. The least mean squares (LMS) algorithm is usually used to adapt the coefficients of the equalizer. This algorithm aims to minimise the mean square error at the slicer. This error will primarily consist of uncanceled ISI and residual additive noise. Such an arrangement is described in European Patent Application EP0467412 (Fujitsu Limited). However, in certain communication systems the decision device (slicer) produces erroneous decisions with too high a probability. This is particularly the case for Gigabit ethernet communication systems because of the positioning of the DFE before a convolutional decoder.

The main problems with analog equalizers are:

Its performance assumes a highly simplified channel model, for instance effects like structural return loss (SRL) are not considered. These effects cannot be cancelled by the analog equalizers.

Its adaptation algorithm does not take additive noise into consideration, therefore it cannot make the right trade-off between cancelling ISI and attenuating additive noise.

Some adaptation algorithms have difficulties handling gain or offset errors.

The FIR digital equalizer has difficulty handling the cable's low frequency effects. These effects tend to last for a long time and are difficult to cancel by a filter with finite impulse response of reasonable length. The number of coefficients of the equalizer would have to significantly grow if these effects were to be cancelled with an FIR filter.

It is proposed in Samulei et al (*IEEE Journal on selected Areas in Communications*, volume 9, no. 6 August 1991 pages 839-847) and the document referenced therein Chen, W.Y. (Proc. 1990 *IEEE Int. Symp. Circ. Syst*, May 1990 pages 1947-1950), to use an infinite impulse response (IIR) filter in conjunction with an FIR filter to reduce the complexity of the FIR filter. The IIR filter is adapted to the cable characteristics using an LMS-type algorithm. This approach appears to require considerable area and power in ASIC implementations.

Also, it is more difficult to meet the performance requirements at longer cable lengths, however the system bit error rate (BER) needs to be met at all cable lengths.

The invention is thus directed towards providing for improved compensation to address these problems.

SUMMARY OF THE INVENTION

According to the invention there is provided an equalization system for a data receiver, the system comprising a digital equalizer, characterized in that, the digital filter comprises a plurality of fixed sets of taps;

each said set of taps is suitable for different cable characteristics; and the equalizer further comprises a decision device comprising means for selecting an optimum set of taps.

In one embodiment the sets of taps are in an infinite impulse response (IIR) structure.

In one embodiment a set of taps is optimal for shorter cable lengths.

In another embodiment the system further comprises an analog filter and said set of taps comprises means for cancelling adaptation of the analog filter.

In a further embodiment a set of taps is optimal for longer cable lengths and comprises means for matching lower frequencies.

In one embodiment the system further comprises a feed forward equalizer between the analog filter and the digital filter.

In one embodiment the decision device comprises means for selecting a set of taps by comparing performance of the system with each of the sets of taps individually selected.

In a further embodiment the decision device comprises means for selecting a set of taps at every start-up.

In one embodiment the decision device comprises a measurement circuit for measuring the power of the noise output associated with a set of taps.

In one embodiment the measurement circuit comprises a squarer and an accumulator.

DETAILED DESCRIPTION OF THE INVENTION

The invention will be more clearly understood from the following description of some embodiments thereof, given by way of example only with reference to the accompanying drawings in which:

DESCRIPTION OF THE EMBODIMENTS

Figure 1:
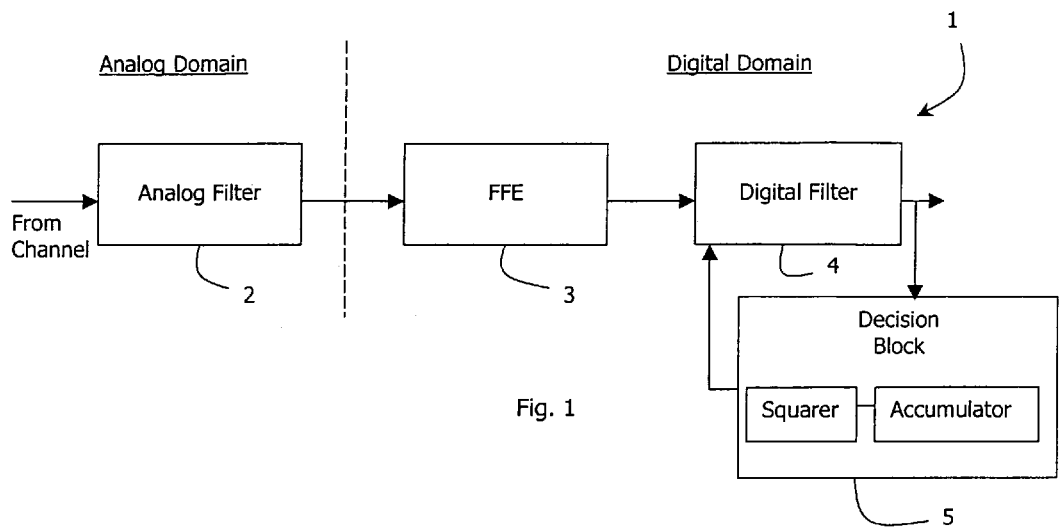
FIG. 1 is a block diagram illustrating equalizer components of the invention.

Referring to FIG. 1, equalization components 1 of a 1000BASE-T receiver comprise an analog filter 2, a feed forward equalizer 3, and a digital filter 4. The output of the digital filter is fed to a decision block 5.

In more detail, the analog filter 2 is not adaptive. It has a fixed mode, suitable for much of the adaptation required for the longest permissible cable length. However, it is ineffective for short lengths. The FFE 3 is conventional.

The digital filter 4 has two sets of taps in a simple IIR structure. One set is optimal for shorter cable lengths as it cancels the adaptation of the analog filter and also caters for noise arising from SRL and additive noise. The second set is optimal for long cable lengths, and so it assists operation of the analog filter 2. An aspect of the second set of taps is that it matches lower frequencies, something not done effectively by the analog filter 1 or the FFE 3.

The decision block 5 selects the set of taps appropriate for any particular channel. It does this by, at start-up, comparing the performance of the system with the filter 4 in both settings and selecting the set giving the best signal to noise ratio. A slicer and measurement circuitry within the block 5 perform the measurements and comparisons.

The measurement circuitry comprises a squarer and an accumulator for subtracting the symbols from the combined incoming symbols and noise.

In a first setting of the digital filter 4 the block 5 uses the digital filter output and its own internal squarer and accumulator to measure the power of the noise at the digital filter output. After an appropriate time this power is stored and this measurement is repeated for the other set of taps. The set of taps providing the lower noise value is selected.

Figure 2:
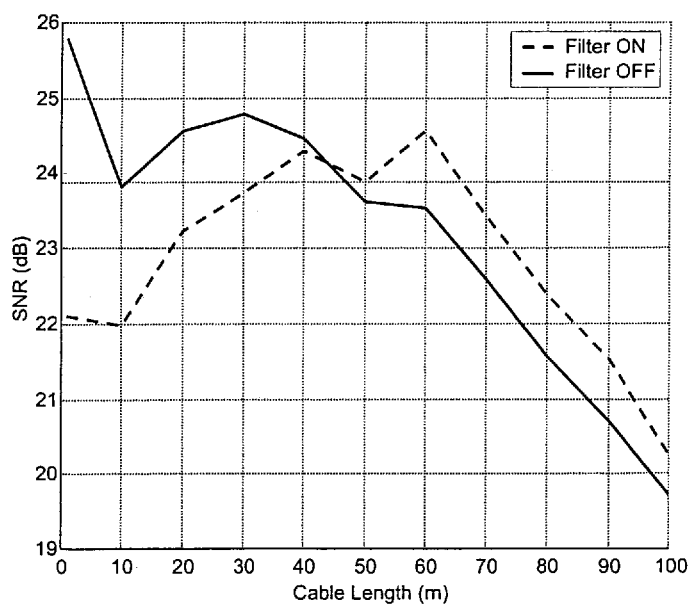
FIG. 2 is a plot of channel performance.

Referring to FIG. 2, it can be seen that the performance improves for lengths greater than 50 m where the fixed filter is applied.

The invention is not limited to the embodiments described but may be varied in construction and detail.

The invention claimed is:

1. An equalization system for a data receiver, the system comprising a digital equalizer, which comprises:
   a digital filter comprising a plurality of fixed sets of taps;
   each of said sets of taps being suitable for different cable characteristics; and
   the digital equalizer further comprising a decision device for selecting an optimum set of taps;
   wherein said sets of taps are in an infinite impulse response (IIR) structure;
   wherein a set of taps is optimal for shorter cable lengths;
   wherein the system further comprises an analog filter and said set of taps cancels adaptation of the analog filter;
   wherein an output of the digital filter is fed to the decision device and an output of the decision device is fed back to the digital filter;
   wherein the decision device selects a set of taps by comparing performance of the system with each of said sets of taps that are individually selected;
   wherein the decision device comprises a measurement circuit for measuring the power of the noise output associated with said each of said sets of taps that are individually selected; and
   wherein the measurement circuit comprises a squarer and an accumulator.

2. The equalization system for a data receiver as claimed in claim 1, wherein a set second of taps is optimal for longer cable lengths and matches lower frequencies.

3. The equalization system for a data receiver as claimed in claim 1, wherein the system further comprises a feed forward equalizer between the analog filter and the digital filter.

4. The equalization system for a data receiver as claimed in claim 1, wherein the decision device selects a set of taps at every start-up.

5. A data receiver comprising an equalization system for the receiver, the system comprising a digital equalizer, which comprises:
   a digital filter comprising a plurality of fixed sets of taps;
   each of said sets of taps being suitable for different cable characteristics; and
   the digital equalizer further comprising a decision device for selecting an optimum set of taps;
   wherein said sets of taps are in an infinite impulse response (IIR) structure;
   wherein a set of taps is optimal for shorter cable lengths;
   wherein the system further comprises an analog filter and said set of taps cancels adaptation of the analog filter;
   wherein an output of the digital filter is fed to the decision device and an output of the decision device is fed back to the digital filter;
   wherein the decision device selects a set of taps by comparing performance of the system with each of said sets of taps that are individually selected;
   wherein the decision device comprises a measurement circuit for measuring the power of the noise output associated with said each of said sets of taps that are individually selected; and
   wherein the measurement circuit comprises a squarer and an accumulator.

6. An equalization system for a data receiver, the system comprising a digital equalizer, which comprises:
   a digital filter comprising a plurality of fixed sets of taps;
   each of said sets of taps being suitable for different cable characteristics; and
   the digital equalizer further comprising a decision device for selecting an optimum set of taps;
   wherein said the of taps are in an infinite impulse response (IIR) structure;
   wherein a first set of taps is optimal for shorter cable lengths;
   wherein a second set of taps is optimal for longer cable lengths and matches lower frequencies;
   wherein the system further comprises an analog filter and said first set of taps cancels adaptation of the analog filter;
   wherein the system further comprises a feed forward equalizer between the analog filter and the digital filter;
   wherein an output of the digital filter is fed to the decision device and an output of the decision device is fed back to the digital filter;
   wherein the decision device selects a set of taps at every start-up by comparing performance of the system with each of said sets of taps that are individually selected;
   wherein the decision device comprises a measurement circuit for measuring the power of the noise output associated with said each of said sets of taps that are individually selected; and
   wherein the measurement circuit comprises a squarer and an accumulator.

7. A data receiver comprising an equalization system for the data receiver, the system comprising a digital equalizer, which comprises:
   a digital filter comprising a plurality of fixed sets of taps;
   each of said sets of taps being suitable for different cable characteristics; and the digital equalizer further comprising a decision device for selecting an optimum set of taps;

wherein said sets of taps are in an infinite impulse response (IIR) structure;

wherein a first set of taps is optimal for shorter cable lengths;

wherein a second set of taps is optimal for longer cable lengths and matches lower frequencies;

wherein the system further comprises an analog filter and said first set of taps cancels adaptation of the analog filter;

wherein the system further comprises a feed forward equalizer between the analog filter and the digital filter;

wherein an output of the digital filter is fed to the decision device and an output of the decision device is fed back to the digital filter;

wherein the decision device selects a set of taps at every start-up by comparing performance of the system with each of said sets of taps that are individually selected;

wherein the decision device comprises a measurement circuit for measuring the power of the noise output associated with said each of said sets of taps that are individually selected; and wherein the measurement circuit comprises a squarer and an accumulator.

* * * * *